United States Patent
Wichmann (10) Patent No.: US 10,465,256 B2
(45) Date of Patent: Nov. 5, 2019

(54) METHOD OF INCREASING WATER SOLUBLE NUTRIENT EXTRACTION FROM PLANT MATTER

(71) Applicant: HealthPro Brands, Inc., Loveland, OH (US)

(72) Inventor: Todd Wichmann, Loveland, OH (US)

(73) Assignee: HealthPro Brands, Inc., Loveland, OH (US)

( * ) Notice: Subject to any disclaimer, the term of this patent is extended or adjusted under 35 U.S.C. 154(b) by 114 days.

(21) Appl. No.: 15/475,584

(22) Filed: Mar. 31, 2017

(65) Prior Publication Data

US 2018/0282828 A1    Oct. 4, 2018

(51) Int. Cl.
*C13B 20/00*    (2011.01)
*C13B 30/02*    (2011.01)
(Continued)

(52) U.S. Cl.
CPC ............ *C13B 20/00* (2013.01); *A23L 33/105* (2016.08); *B01D 11/0288* (2013.01); *B01D 11/0292* (2013.01); *B01D 21/00* (2013.01); *C13B 10/02* (2013.01); *C13B 10/08* (2013.01); *C13B 20/005* (2013.01); *C13B 20/08* (2013.01); *C13B 30/02* (2013.01)

(58) Field of Classification Search
None
See application file for complete search history.

(56) References Cited

U.S. PATENT DOCUMENTS

| 2,482,750 A | 9/1949 | Erickson et al. |
| 3,635,819 A * | 1/1972 | Kaiser .................... H01F 1/44 |
| | | 210/634 |

(Continued)

FOREIGN PATENT DOCUMENTS

| GB | 363476 A | 12/1931 |
| JP | H06287199 A | 10/1994 |
| WO | 2006097929 A2 | 9/2006 |

OTHER PUBLICATIONS

Cao et al, enyzmatic hydrolysis and ethanol yields of combined surfactant and dilute ammonia treated sugarcase bagasse, bioresource technology, 131, pp. 357-364 (Year: 2013).*

(Continued)

*Primary Examiner* — Melvin C. Mayes
*Assistant Examiner* — Stefanie J Cohen
(74) *Attorney, Agent, or Firm* — Wood Herron & Evans LLP (57) ABSTRACT

Improved processes for extracting water soluble nutrients including sugars from plants and in particular sugar cane. The plants may be washed with a wash solution. After washing, water soluble nutrient containing liquid is extracted from the plants. A diluted wash solution may be added to the crushed plants to improve the extraction of the water soluble nutrients. The wash solution may be added to the liquid collected during the extraction to improve the separation of impurities from the nutrient containing liquid. The extracted liquid may demonstrate at least one of improved purity, improved clarity, improved filtration times, improved whiteness, and improved total recovered water soluble nutrients.

18 Claims, 7 Drawing Sheets
(2 of 7 Drawing Sheet(s) Filed in Color)

SAMPLE A (water)        SAMPLE B (wash solution)

(51) Int. Cl.
B01D 11/02 (2006.01)
B01D 21/00 (2006.01)
C13B 10/02 (2011.01)
C13B 10/08 (2011.01)
C13B 20/08 (2011.01)
A23L 33/105 (2016.01)

(56) References Cited

U.S. PATENT DOCUMENTS

| | | | | |
|---|---|---|---|---|
| 4,842,877 | A | * | 6/1989 | Tyson .................. A61L 15/28 127/37 |
| 7,691,283 | B2 | * | 4/2010 | Ohba .................. A62D 1/0042 252/3 |
| 8,828,142 | B2 | * | 9/2014 | Oliveira .................. C13B 5/02 127/44 |
| 2002/0011246 | A1 | | 1/2002 | Reisig et al. |

OTHER PUBLICATIONS

International Search Authority, Search Report and Written Opinion issued in corresponding International Application No. PCT/US2017/033537 dated Aug. 16, 2017 (11 pages).
Nilsson, M., et al., "Water unextractable polysaccharides from three milling fractions of rye grain," Carbohydrate Polymers, May 16, 1996, pp. 229-237, vol. 30, Elsevier (9 pages).

* cited by examiner

METHOD OF INCREASING WATER SOLUBLE NUTRIENT EXTRACTION FROM PLANT MATTER

TECHNICAL FIELD

The present invention relates to a process for extracting water soluble nutrients from plants and, more particularly, to processes for extracting sugars from plant matter.

BACKGROUND

Sugar and other water soluble nutrients may be extracted from plant matter. For example, relatively pure sucrose, which is a disaccharide of glucose and fructose and is the primary sugar in sugar cane, may be obtained from sugar cane or sugar beets during a milling and/or pressing process. The extracted sugars may then be refined for later use, for example, as a sweetener, such as table sugar, and/or in alcohol production, such as ethanol. Other sugars and water soluble nutrients, such as glucose, galactose, and fructose, as well as disaccharides thereof, may also be extracted from plant matter, including sugar cane and sugar beets, for example.

Sugar containing plants such as sugar cane have two primary components, a fiber component that forms the structure of the plants, and a liquid component that contains the sugars. The sugar containing liquid component is typically extracted from the fiber component at a sugar mill. At the mill, plants such as the sugar cane stalks, may be washed prior to extraction. The washing step utilizes water to remove dirt and other potential contaminants from the surface of the plants. The plants may be washed such as by spraying or immersing in the water. Routine washing techniques can leave some residual dirt and other contaminants remaining on the plants that can contaminate the extracted sugars and must be removed during the filtering and refining process. Improvements in washing the plants are needed to decrease contamination of the extracted sugars and to improve the refining process.

For sugar cane processing, after washing, the stalks of sugar cane undergo a cane breaking process in which the tough outer covering of the stalks are broken and the cane is ground or crushed into smaller pieces from which the liquid fraction is extracted. The liquid fraction may then be extracted from the ground or crushed cane by combination of pressing and imbibition. Imbibition is a process in which water or previously extracted cane liquid is applied to the ground or crushed cane to enhance the extraction of the sugar containing liquid fraction from the fibrous component during the pressing step. Greater amounts of water used in the imbibitions step typically yields more sugar, but this also creates a more dilute juice and, thus, more energy is required to evaporate the juice in the downstream refining process.

In a typical pressing process, the ground or crushed stalks are exposed to a first pressing to separate the liquid component from fiber component. The left over fiber component is referred to as the bagasse. The collected liquid component from the first pressing may be diluted with water or may be used in its undiluted form and reapplied to the bagasse in an imbibition step to extract additional sugar in a second pressing step. Additional imbibition and pressing steps may be utilized with the bagasse to achieve maximum sugar extraction. Typical extraction methods obtain a cane liquid fraction with around 15% sugar content. Improvements in the milling process are needed that result in a higher concentration of sugar in the extracted liquid.

Sugar mills are large and costly plants that represent significant capital investments. It would be beneficial to improve the yield of sugar and/or other nutrients of interest extracted from sugar cane or other plant materials without requiring significant alterations to existing mill and extraction facilities.

SUMMARY

Aspects of the invention relate to improved processes for extracting sugar and other water soluble nutrients from plants, and in particular sugar from sugar cane, sugar beets, corn, carrots, and other sugar containing plants. In embodiments of the process, sugar-containing plants, are washed with a wash solution. After washing, sugar-containing liquid is extracted from the plants.

In another embodiment, ground sugar cane stalks, bagasse, or both ground sugar cane stalks and bagasse are contacted with a dilute wash solution in an imbibition step. The water soluble nutrients are then extracted from the ground stalks or bagasse. In an embodiment, the water soluble nutrients are extracted by pressing the ground stalks or bagasse. The liquid extracted from the ground stalks, the bagasse, or both the ground stalks and bagasse is collected. The extracted liquid demonstrates at least one of improved purity, improved clarity, improved filtration times, or improved total recovered water soluble nutrients such as sugars.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

The present invention is directed to improved processes for extracting sugar and other water soluble nutrients from plants and in particular sugar from sugar cane, sugar beets, corn, carrots, and other sugar containing fruits and vegetables. An embodiment of the invention is directed to extracting sugar from sugar cane.

Thus, in accordance with an embodiment of the present invention, sugar cane stalks are harvested from a field and the leaves are removed. The sugar cane is then typically transported to a mill where the sugar-containing liquid and other water soluble nutrients are extracted from the fibrous solids.

In an embodiment, the sugar cane stalks are washed in a wash solution prior to sugar extraction steps. The washing step typically involves applying a wash solution in accordance with the embodiments of the wash solution described herein to the surface of the stalks. In an embodiment, the wash solution is sprayed onto the surface of the stalks. In another embodiment, the stalks are immersed in the wash solution for a desired period of time. The washing step may optionally include agitating the stalks in the wash solution. The wash solution may be used in its full strength or in a diluted form as described in greater detail below. Typically, the stalks are washed after the leaves have been removed from the stalks.

Without being bound by any particular theory, it is believed that the wash solution not only serves to clean the sugar cane stalks of dirt and debris, but the chemical energy within the wash solution appears to also remove natural waxes from the outer surface of the stalks, which may allow liquid to better penetrate the fibers of the sugar cane stalks during later extraction steps. More specifically, the external surface of sugar cane stalks includes a thick waxy layer. This waxy layer is hydrophobic and may prevent efficient extraction of the liquid component from the fibrous component. Advantageously, removing or decreasing the waxy layer on the external surface of sugar cane stalks provides improved extraction of water soluble nutrients from the sugar cane stalks. Moreover, during the subsequent imbibition and extraction steps, the washing solution acts as a wetting agent, to extract more sugar out of the cane instead of relying on mechanical energy alone.

The wash solutions are described in greater detail below. In an embodiment, the wash solutions are used at full strength, i.e., not diluted in water. In alternative embodiments, the wash solutions are diluted in water. The wash solution may be diluted with water by a factor ranging from 10 to 50. In an embodiment, the diluted wash solution includes wash solution ranging between 1% by volume and 10% by volume and water ranging between about 90% by volume and 99% by volume. In another embodiment, the diluted wash solution includes wash solution ranging between 2% by volume and 5% by volume and water ranging between about 95% by volume and 98% by volume. In another embodiment, the diluted wash solution includes wash solution ranging between 2% by volume and 4% by volume and water ranging between about 96% by volume and 98% by volume.

The volume of wash solution necessary to wash a certain mass of stalks may vary depending on the washing method that is being used. When stalks are washed by immersion, about 1 liter of diluted wash solution is typically used for every about 1 kg to about 1.5 kg of stalks. In an exemplary embodiment, about 25 kg of stalks are washed by immersion in about 20 liters of diluted wash solution. When stalks are washed by spraying, about 25 ml to about 50 ml of wash solution (undiluted) is typically used for every about 1 kg of stalks.

In an embodiment, the stalks are contacted with wash solution for a period of time that ranges between about 30 seconds and about 5 minutes. In another embodiment, the stalks are contacted with wash solution for a period of time that ranges between about 45 seconds and about 3 minutes. In another embodiment, the stalks are contacted with wash solution for a period of time that ranges between about 45 seconds and about 2 minutes. In another embodiment, the stalks are washed for about 1 minute.

The sugar cane and wash solution may be agitated in a tumbler that includes a wash chamber that rotates about an axis to agitate the sugar cane and wash solution contained therein. Alternatively, in embodiments wherein the stalks are sprayed, agitation is supplied by the spraying action. Other methods of agitating the sugar cane and wash solution mixture may also be used.

The washed stalks may be separated from the wash solution. In an embodiment, the wash solution is allowed to drain away from the stalks. In another embodiment, the stalks are immersed in and then removed from the wash solution. The stalks may optionally undergo one or more rinsing steps in which the stalks are rinsed, such as by spraying with or immersing in water or another wash solution. Due to the toxicologically acceptable and organic nature of embodiments of the wash solutions utilized herein, rinsing is not necessary, and, in some embodiments, is specifically avoided.

As part of the extraction process, the sugar cane stalks undergo a cane breaking process which includes the steps of breaking the hard outer structure of the cane and then grinding the cane. In an embodiment, the washing step is performed prior to the cane breaking process. In another embodiment, the washing step is performed during the cane breaking process. In yet another embodiment, the washing step is performed after cane breaking process. In yet another embodiment, the washing step is performed is performed during at least two before, during, or after the cane breaking process.

The cane breaking process typically utilizes revolving knives, shredders, crushers, or a combination of these processes to break the larger stalks into the smaller sections. In an embodiment of the cane breaking process, the stalks are broken into a length that ranges from about 6 inches to about 18 inches and preferably about 10 inches. In another embodiment, the cane breaking process may include grinding, crushing, or both grinding and crushing the sugar cane stalks into even smaller pieces with roller mills or other grinding structures as are known in the art. Stalks that have been ground or crushed prior to extraction are collectively referred to herein as ground stalks.

The sugar containing liquid is extracted from the fibrous solids of the ground stalks such as by pressing utilizing devices and processes as known in the art, and the sugar containing liquid is collected leaving behind the bagasse. Part of the extraction process includes an imbibition step in which an imbibition liquid, such as extracted cane juice, water, a dilute wash solution, and combinations thereof, is applied to the ground stalks and/or bagasse to enhance the extraction of sugars from the fibrous component of the stalks in a series of subsequent pressing steps. In an embodiment, the imbibition liquid is a dilute formulation of the wash solution that may be used alone or in combination with extracted cane juice. In an exemplary embodiment, the ground stalks are pressed in a first pressing and the sugar containing liquid is collected. The first pressing may include an imbibition step wherein imbibition liquid is applied to the ground stalks. The collected liquid may be mixed with a diluted wash solution and applied to the bagasse in an imbibition step before another round of pressing wherein the liquid is collected again. The collected juice may be used in a plurality of subsequent imbibition and pressing cycles, with additional sugars being extracted from the bagasse with each cycle. In an embodiment, the ground stalks and the bagasse undergo at least five pressing cycles, wherein at least a portion of the pressing cycles includes an imbibition step. In another embodiment, the bagasse undergoes from 1 to 5 pressing cycles, wherein at least a portion of the cycles includes an imbibition step. In an embodiment, all of the pressing cycles include an imbibition step.

In an embodiment, about 200 ml to about 400 ml of diluted wash solution is used for imbibition of about 0.5 kg to about 1.5 kg of crushed stalks or bagasse. In another embodiment, about 250 ml to about 350 ml of diluted wash solution is used for imbibition of about 0.8 kg to about 1.2 kg of crushed stalks or bagasse. In another embodiment, about 300 ml of diluted wash solution is used for the imbibition of about 1 kg of crushed stalks or bagasse.

The collected liquid may be filtered and, if desired, further refined utilizing routine processes into crystallized table sugar, molasses, and other sugar based products or utilized in the production of alcohols. The collected liquid may demonstrate one or more of the following desired characteristics: higher total recovered sugars (ATR), higher sucrose content, higher purity, less fiber, improved filtration processing times, and improved clarity, all as compared to liquid collected from sugar cane not contacted with wash solution. Without being bound to a particular theory, the wash solution improves the quality of the extracted liquid by providing chemical energy that improves water penetration into the fibers of the plant and by acting as a wetting agent.

In an embodiment, wash solution is added to the collected liquid and the liquid undergoes an impurities separation process. In an embodiment, the impurities separation process involves allowing the impurities to settle out of the collected liquid in tanks such as storage tanks and settling tanks. In an embodiment, the collected liquid is collected from stalks that have been exposed to the wash solution, such as during at least one of the washing step, the cane breaking process, or the extraction process. In another embodiment, the collected liquid is collected from stalks that have not been exposed to the wash solution. The wash solution may be added to the collected liquid to in an amount sufficient to improve the separation of impurities from the collected liquid as compared to the separation of impurities from collected liquid that has not been exposed to the wash solution. In an embodiment, the wash solution is added to the collected liquid in a range from about 0.1 vol % to about 10 vol %.

The collected liquid typically has a high water content that must be reduced to form sugar crystals. To reduce water content, the collected liquid may be dry in a centrifuge to provide sugar crystals that are then further dried, such as on a fluid bed drier. In an embodiment, the wash solution may be added to the collected liquid prior to or during the water reduction process. In an embodiment, the collected liquid is collected from stalks that have been exposed to the wash solution, such as during at least one of the washing step, the cane breaking process, the extraction process, or impurity separation process. In another embodiment, the collected liquid is collected from stalks that have not been exposed to the wash solution. The wash solution may be added to the collected liquid to in an amount sufficient to remove impurities from the collected liquid during the water reduction process as compared to the removal impurities from collected liquid that has not been exposed to the wash solution during the water reduction step. In an embodiment, the wash solution is added to the collected liquid in a range from about 0.1 vol % to about 10 vol %.

The methods utilizing the wash solution as described herein result in at least one of increased sugar yield, higher quality whiter sugar, and reduced energy consumption during the sugar purification process. Without being bound to a particular theory, one more of these benefits are obtained because the methods described herein increase the sugar content of the collected liquid, sometimes referred to as the Brix and improve the removal of impurities from the collected liquid. Increasing the sugar content of the collected liquid reduces the energy required during the purification process less water will be required to be removed from the collected liquid in order to obtain the purified crystals. With respect to embodiments of the invention that result in improved sugar whiteness and quality, whiteness can be evaluated using the ICUMSA scale, from 0 to 6 wherein 0 is the maximum whiteness. An improvement in whiteness may be determined as an improvement in the color of the sugar based on the ICUMSA scale when the sugar is obtained from at least one of the processes described herein that utilizes the wash solution as compared to sugar that is obtained from processes that do not utilize the wash solution. The quality of the sugar may also be based on granule size, which is typically classified as small (S), medium (M), or large (L). The granule size may be determined on a sifter that may also remove fine granules and lumps from the graded sugar. In an embodiment, an improvement in sugar grade based on granule size may be determined by comparing the grade of sugar obtained from at least one of the processes described herein that utilizes the wash solution as compared to sugar that is obtained from processes that do not utilize the wash solution.

In an embodiment, the wash solution includes a surface activating agent (i.e., a surfactant/wetting agent), a hydroxide solution (e.g., aqueous NaOH or KOH), and may further include a compatibilizing agent (e.g., an alcohol such as glycerin or ethanol) to solubilize the sodium salt of the surfactant. The surface activating agent may be an anionic surfactant, a non-ionic surfactant, or a combination thereof. The surface activating agent may include fatty acids and/or a salts thereof. In an embodiment, the surface activating agent is oleic acid. The wash solution may optionally include additional components such as, without limitation, a buffer, a preservative, and an antioxidant. In a preferred embodiment, the wash solution includes oleic acid, glycerin and/or ethanol, and enough aqueous sodium hydroxide or other hydroxide solution to give the wash solution a pH in a range from about 10 to 13, and preferably from about 11 to 12.

As described above, wash solutions may be sold and/or used at full strength or may be diluted. In an embodiment, the wash solution may include surface activating agent in a range of from 20% to 40%, a compatibilizing agent in a range of from 30% to 50%, and a hydroxide solution in a range of from 20% to 40%, where the percentages are weight percentages of relative to the other listed components (e.g., not including water used for dilution). In an embodiment, the wash solution may include 28% oleic acid, 21% glycerin, 21% ethyl alcohol, and 30% potassium hydroxide, where the percentages are weight percentages relative to the other listed components (e.g., not including any water used for dilution). In an embodiment wherein the wash solution is diluted with water, the wash solution includes a surface activating agent in a range of from 1% to 5%, a compatibilizing agent in a range of from 1% to 5%, a hydroxide solution in a range of from 1% to 5%, and water in a range of from 85% to 97%. In an embodiment wherein the wash solution is diluted with water, the wash solution includes 2.65% oleic acid, 2% glycerin, 2% ethyl alcohol, 2.90% potassium hydroxide (45% aqueous solution), and 90.45% deionized water.

An advantage of this wash solution formulation is that it may be certified organic. For example, an organic source of oleic acid containing oil, such as organic high oleic sunflower oil, olive oil, pecan oil, canola oil, peanut oil, macadamia nut oil, grape seed oil, sea buckthorn oil, and sesame seed oil, may be used. The oleic containing triglycerides may be mixed with a hydroxide solution such as sodium hydroxide to induce saponification of the esters in the triglyceride to provide a wash solution having a mixture of various fatty acids including oleic acid and glycerin. Additional hydroxide solution may be added to reach the desired pH range recited above.

The following toxicologically-acceptable ingredients are used in the preparation of the preferred wash solutions herein. By "toxicologically-acceptable" is meant that any residues from the ingredients of the wash solutions which may end up in any extracted sugars are safe for ingestion by humans and lower animals.

Surface Activating Agent—Fatty Acid and/or Salts Thereof—The wash solutions herein are formulated using a surface activating agent, which may be an unsaturated fatty acid; oleic acid is preferred and convenient for this use. However, the particular oleic acid that is selected should preferably be low in polyunsaturates, e.g., contain less than about 10%, preferably less than about 7%, more preferably less than about 5% and will typically have an Iodine Value (IV) of from about 70 to about 100, preferably from about 83 to about 95, more preferably from about 85 to about 90. Polyunsaturated fatty acids are not preferred herein, due to odor problems. However, this is primarily from aesthetic considerations since such acids are effective in cleaning. In some embodiments, the amount of polyunsaturated fatty acids should be less than about 8%, preferably 0%. In some embodiments, the amount of polyunsaturated fatty acids with more than about two double bonds should be less than about 1%, preferably 0%. Saturated fatty acids are generally unacceptable as they have limited solubility for longer chain length materials ($\geq C_{12}$), or have unacceptable odor ($\leq C_{14}$). For example, stearic and/or tallow fatty acids soaps, even potassium soaps, do not have enough solubility at room temperature, where most sugar cane cleaning is done, to formulate even wash solutions containing the minimum of about 0.1% soap required for acceptable cleaning. Other specific solubilizing surfactants in higher proportions would be required to solubilize these saturated fatty acids. Pamolyn 100 FGK oleic acid is a good example of a suitable commercial fatty acid.

Surface Activating Agent—Surfactants—Optionally, acid or base stable anionic surfactants can be employed, as allowed by the United States Code of Federal Regulations, Title 21, Section 173.315. Preferred are salts of dodecylbenzene sulfonate, typically at levels up to 0.2%. Also described in the C.F.R. are phosphate esters of ethylene and/or ethylene/propylene oxide adducts of aliphatic alcohols, dioctyl sulfosuccinate, or 2-ethylhexyl sulfate, typically but these materials suffer from lack of stability at either acid or basic conditions.

Optional Buffer—In an embodiment, toxicologically-acceptable acidic or basic buffers can be used in the wash solutions herein to maintain product pH in the acid or base range. For ease of formulatability, it is highly preferred that such acidic and basic buffers be in their potassium salt form. Citric acid is a preferred acid pH buffer, and in the basic pH systems, potassium citrate is a preferred dispersant for particulate soils. Potassium carbonate is a convenient and preferred basic pH buffer. Sodium bicarbonate is a highly desirable material to add to the wash solutions of this invention as a part of the buffering system since it is readily available as baking soda in food grade and is therefore relatively inexpensive, while providing a highly desirable purity to the wash solution. Wash solutions formulated with a mixture of potassium and sodium cations in molar ratios of from about 1:1 to about 10:1, preferably from about 2:1 to about 8:1, more preferably from about 4:1 to about 5:1 potassium to sodium, e.g., as provided by mixtures of potassium hydroxide (hydrate) and sodium bicarbonate, have desirable theological properties. The compositions are thick, so as to cling to the sugar cane until spread, but are readily dispensed, e.g., by means of a spray device. The levels and identities of the ingredients are adjusted to provide products having the desired viscosities as set forth herein, e.g., more than about 5, preferably more than about 10, more preferably more than about 50 centipoise when at rest, and less than about 150, preferably less than about 100, more preferably less than about 50 centipoise under shear of $\geq \sim 1000\ \text{sec}^{-1}$.

The ability of the preferred wash solutions containing mixtures of both sodium and potassium cations to shear thin is important to promote easy dispensing, especially when the compositions are sprayed, while maintaining the ability to cling and delay run off after being applied to sugar cane stalks.

The pH is preferably not greater than about 12.5, and especially does not contain large amounts of buffer at higher pHs for consumer safety, especially when the compositions are sprayed.

Optional Preservative—The strategy of formulating the present wash solutions at either high or low pH is based on the reduced tendency for biological growth of contaminants, such as bacteria, fungi, or molds, at either high pH (>9) or low pH (<5). At neutral pH, an increased reliance on preservatives is required to insure the lack of biological growth through contamination in making or in use. The wash solutions herein may optionally contain a minimal amount, typically from about 0.01% to about 0.2% by weight, of a toxicologically-acceptable preservative in order to prevent the growth of fungi, bacteria or like in the product on storage. Standard food-grade preservatives such as potassium sorbate/sorbic acid and/or sodium benzoate/benzoic acid, or mixtures thereof, are suitable for such purposes. For example, from about 0.01% to about 0.2% of benzoic acid or its sodium or potassium salts can be used. In general, the basic pH compositions herein do not require a preservative, although one can be added if desired.

Optional Antioxidants—The use of certain surface activating agents (e.g., commercial oleic acid, or oleate salts) can be complicated by development of off-odors and/or yellowing of the compositions in which they appear. These undesirable properties are believed to be caused by complex side reactions initiated by the reaction of oxygen with primarily the polyunsaturated components of the fatty acid stock. These results can be avoided, or minimized, by avoiding contact with air, or by controlling the quality of the fatty acid stock so that the amount and type of polyunsaturates are minimized as described above, and/or by the addition of antioxidants.

It has been found, that the addition of tocopherols (e.g., Vitamin E, or tocopherol acetates) in alkaline wash solutions is advantageous, as they do not degrade, nor do they impart a strong color. They inhibit the development of off-odors for extended periods of time so that the need for masking scents is minimized, or eliminated, particularly for oleic acid stocks of high quality, as described above. The use of butylated phenols, such as BHT and BHA is also useful, but their effectiveness appears more limited and they can impart stronger colors to the wash solutions. Other food grade antioxidants such as Vitamin C and sulfites, are desirable to prevent deterioration of the wash solutions by the action of oxygen, but care must be taken since vitamin C can suffer color degradation and sulfites can cause odor problems. Sulfites also have been the target of potential health concerns. In acidic formulations, vitamin C can be advantageous since its color degradation is less severe.

Example 1

About 50 kg of sugar cane was manually cut into pieces about 25 cm in length. The cut sugar cane was mixed and divided into two samples each having 25 kg. The first sample (Sample A) was washed by immersion and mixing in 20 liters of tap water for a duration of one minute. The second sample (Sample B) was washed by immersion and mixing in 19 liters of tap water and 0.6 liters of wash solution for a duration of one minute. The wash solution included 2.65% oleic acid, 2% glycerin, 2% ethyl alcohol, 2.90% potassium hydroxide (45%), and 90.45% deionized water. The washed samples were separately ground and pressed at 250 kg/cm$^3$ pressure for a duration of 1 minute to extract the liquid fraction from the fibrous solids. Each of Samples A and Sample B were divided into twenty subsamples weighing 500 mg. The liquid fraction from each subsample was clarified by filtration and analyzed for BRIX (soluble solids as measured on a refratometer) (See FIG. 1 and Table 1), sucrose content in a sacarimeter (See FIG. 2 and Table 2), purity (See FIG. 3 and Table 3), fiber content (See FIG. 4 and Table 4), and total recoverable sugars (ATR) (See FIG. 5 and Table 5).

Figure 1:
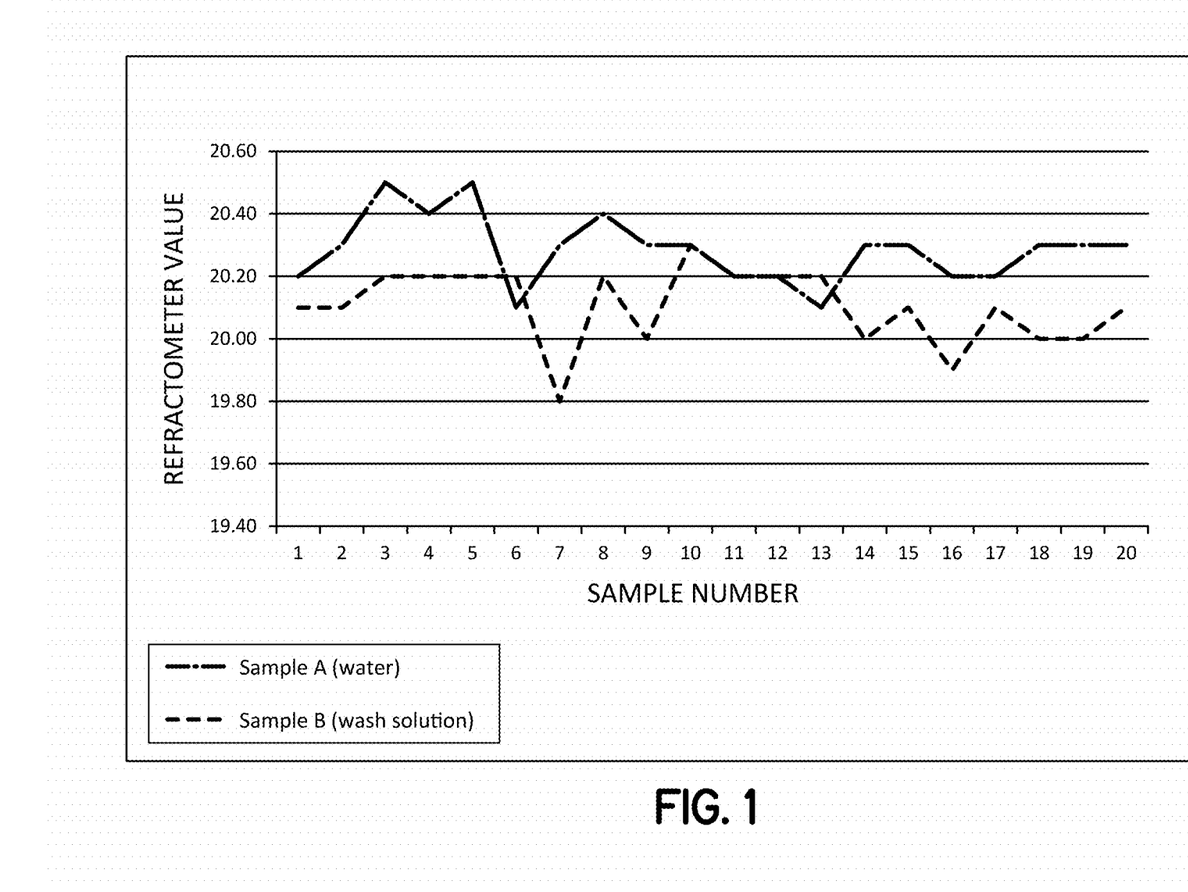
FIG. 1 is a graph of Brix (soluble solids) data content from the extracted liquid collected from 20 subsamples from sugar cane immersed in water (Sample A) or in the washing solution (Sample B) in accordance with embodiments of the invention.

Table 1 includes Brix (soluble solids) data content from the extracted liquid collected from 20 subsamples from Samples A and B illustrated in FIG. 1.

TABLE 1

| Sample | 1 | 2 | 3 | 4 | 5 | 6 | 7 | 8 | 9 | 10 |
|---|---|---|---|---|---|---|---|---|---|---|
| A | 20.2 | 20.3 | 20.5 | 20.4 | 20.5 | 20.1 | 20.3 | 20.4 | 20.3 | 20.3 |
| B | 20.1 | 20.1 | 20.2 | 20.2 | 20.2 | 20.2 | 19.8 | 20.2 | 20.0 | 20.3 |
| Sample | 11 | 12 | 13 | 14 | 15 | 16 | 17 | 18 | 19 | 20 | Avg. |
| A | 20.3 | 20.3 | 20.1 | 20.3 | 20.3 | 20.2 | 20.2 | 20.3 | 20.3 | 20.3 | 20.29 |
| B | 20.2 | 20.2 | 20.2 | 20.0 | 20.1 | 19.9 | 20.1 | 20.0 | 20.0 | 20.1 | 20.11 |

Figure 2:
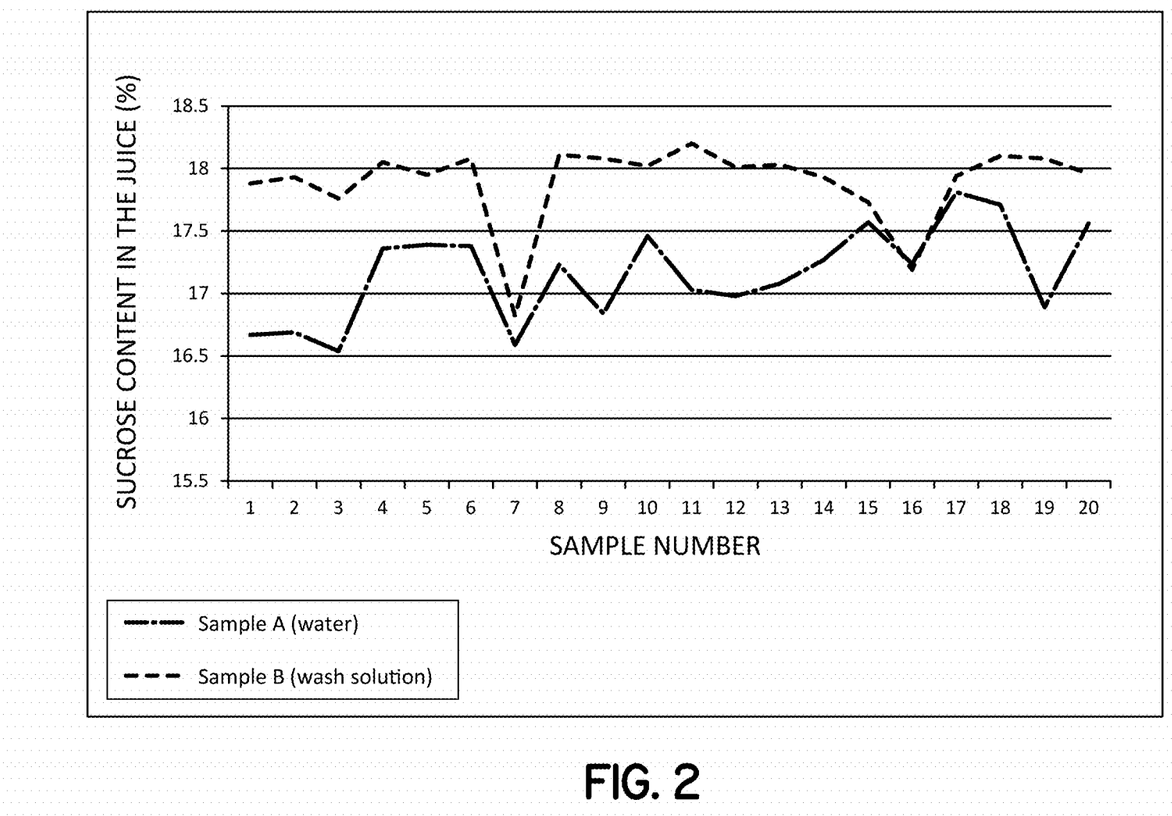
FIG. 2 is a graph of sucrose content (percent sucrose) data content from the extracted liquid collected from 20 subsamples from Samples A and B.

Table 2 includes sucrose content (weight percent sucrose) data content from the extracted liquid collected from 20 subsamples from Samples A and B illustrated in FIG. 2.

TABLE 2

| Sample | 1 | 2 | 3 | 4 | 5 | 6 | 7 | 8 | 9 | 10 |
|---|---|---|---|---|---|---|---|---|---|---|
| A | 16.67 | 16.69 | 16.54 | 17.36 | 17.39 | 17.38 | 16.59 | 17.23 | 16.84 | 17.46 |
| B | 17.88 | 17.93 | 17.76 | 18.05 | 17.95 | 18.08 | 16.82 | 18.11 | 18.08 | 18.02 |
| Sample | 11 | 12 | 13 | 14 | 15 | 16 | 17 | 18 | 19 | 20 | Avg. |
| A | 17.03 | 16.98 | 17.08 | 17.27 | 17.57 | 17.24 | 17.81 | 17.71 | 16.89 | 17.56 | 17.16 |
| B | 18.2 | 18.01 | 18.03 | 17.93 | 17.73 | 17.19 | 17.94 | 18.1 | 18.08 | 17.96 | 17.88 |

Figure 3:
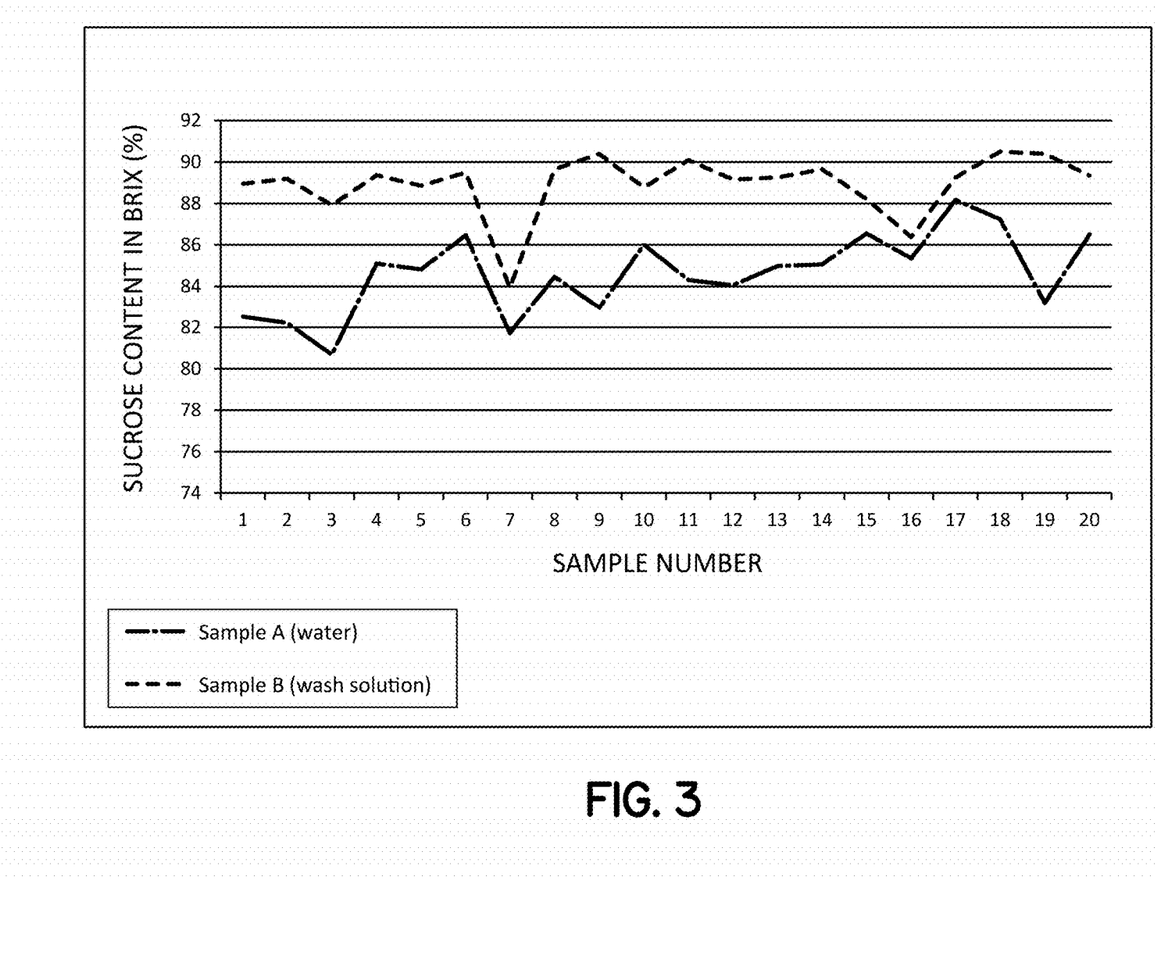
FIG. 3 is a graph of purity data (percent sucrose in Brix) data content from the extracted liquid collected from 20 subsamples from Samples A and B.

Table 3 includes purity data (weight percent sucrose in Brix) data content from the extracted liquid collected from 20 subsamples from Samples A and B illustrated in FIG. 3.

TABLE 3

| Sample | 1 | 2 | 3 | 4 | 5 | 6 | 7 | 8 | 9 | 10 |
|---|---|---|---|---|---|---|---|---|---|---|
| A | 82.52 | 82.22 | 80.68 | 85.1 | 84.83 | 86.47 | 81.72 | 84.46 | 82.96 | 86.01 |
| B | 88.96 | 89.2 | 87.92 | 89.36 | 88.86 | 89.5 | 83.94 | 89.65 | 90.4 | 88.77 |
| Sample | 11 | 12 | 13 | 14 | 15 | 16 | 17 | 18 | 19 | 20 | Avg. |
| A | 84.31 | 84.06 | 84.98 | 85.07 | 86.55 | 85.35 | 88.17 | 87.24 | 83.2 | 86.5 | 84.57 |
| B | 90.1 | 89.16 | 89.26 | 89.65 | 88.21 | 86.38 | 89.25 | 90.5 | 90.4 | 89.35 | 88.91 |

Figure 4:
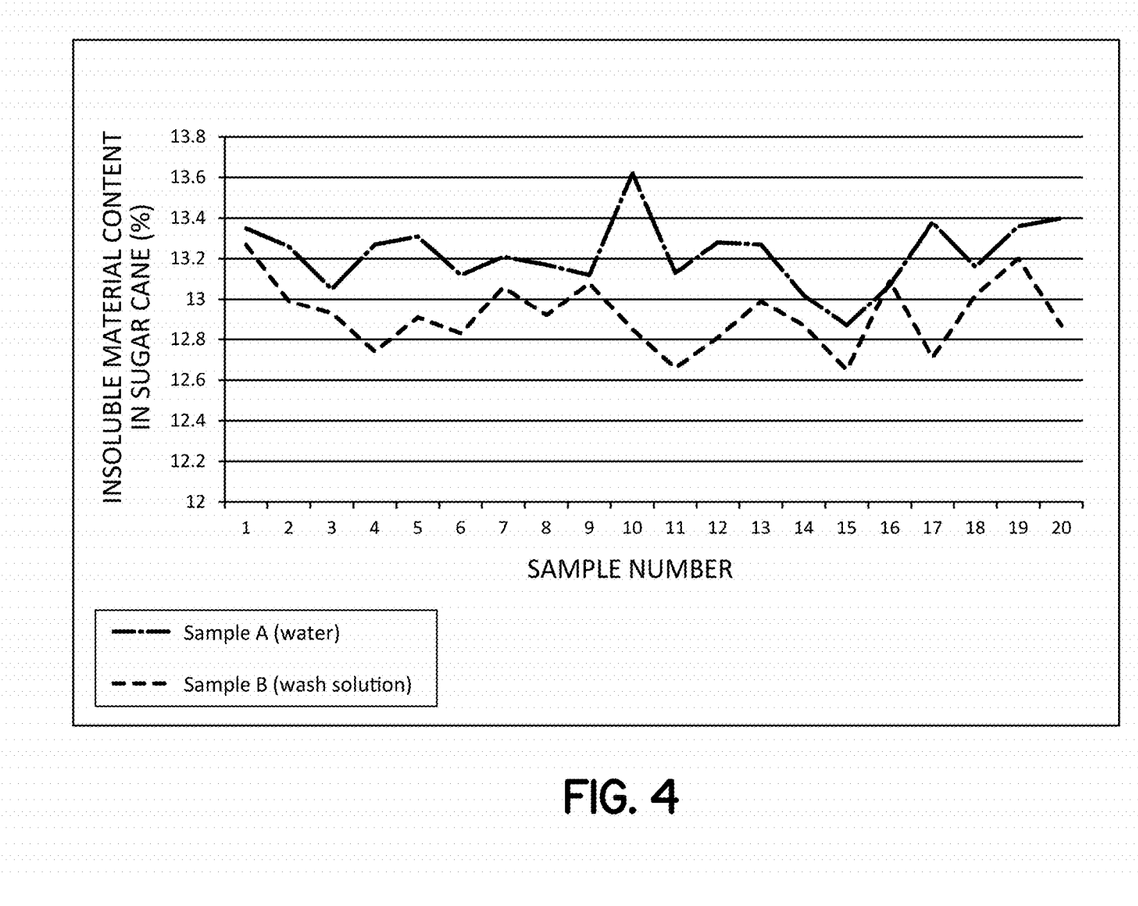
FIG. 4 is a graph of fiber content (insoluble material content) data content from the extracted liquid collected from 20 subsamples from Samples A and B.

Table 4 includes fiber content (insoluble material weight percent) data content from the extracted liquid collected from 20 subsamples from Samples A and B illustrated in FIG. 4.

TABLE 4

| Sample | 1 | 2 | 3 | 4 | 5 | 6 | 7 | 8 | 9 | 10 |
|---|---|---|---|---|---|---|---|---|---|---|
| A | 13.35 | 13.26 | 13.05 | 13.27 | 13.31 | 13.12 | 13.21 | 13.17 | 13.12 | 13.62 |
| B | 13.27 | 12.99 | 12.93 | 12.74 | 12.91 | 12.83 | 13.06 | 12.92 | 13.08 | 12.85 |

| Sample | 11 | 12 | 13 | 14 | 15 | 16 | 17 | 18 | 19 | 20 | Avg. |
|---|---|---|---|---|---|---|---|---|---|---|---|
| A | 13.13 | 13.28 | 13.27 | 13.02 | 12.87 | 13.07 | 13.38 | 13.16 | 13.36 | 13.4 | 13.22 |
| B | 12.66 | 12.81 | 12.99 | 12.87 | 12.65 | 13.09 | 12.71 | 13.02 | 13.2 | 12.87 | 12.92 |

Figure 5:
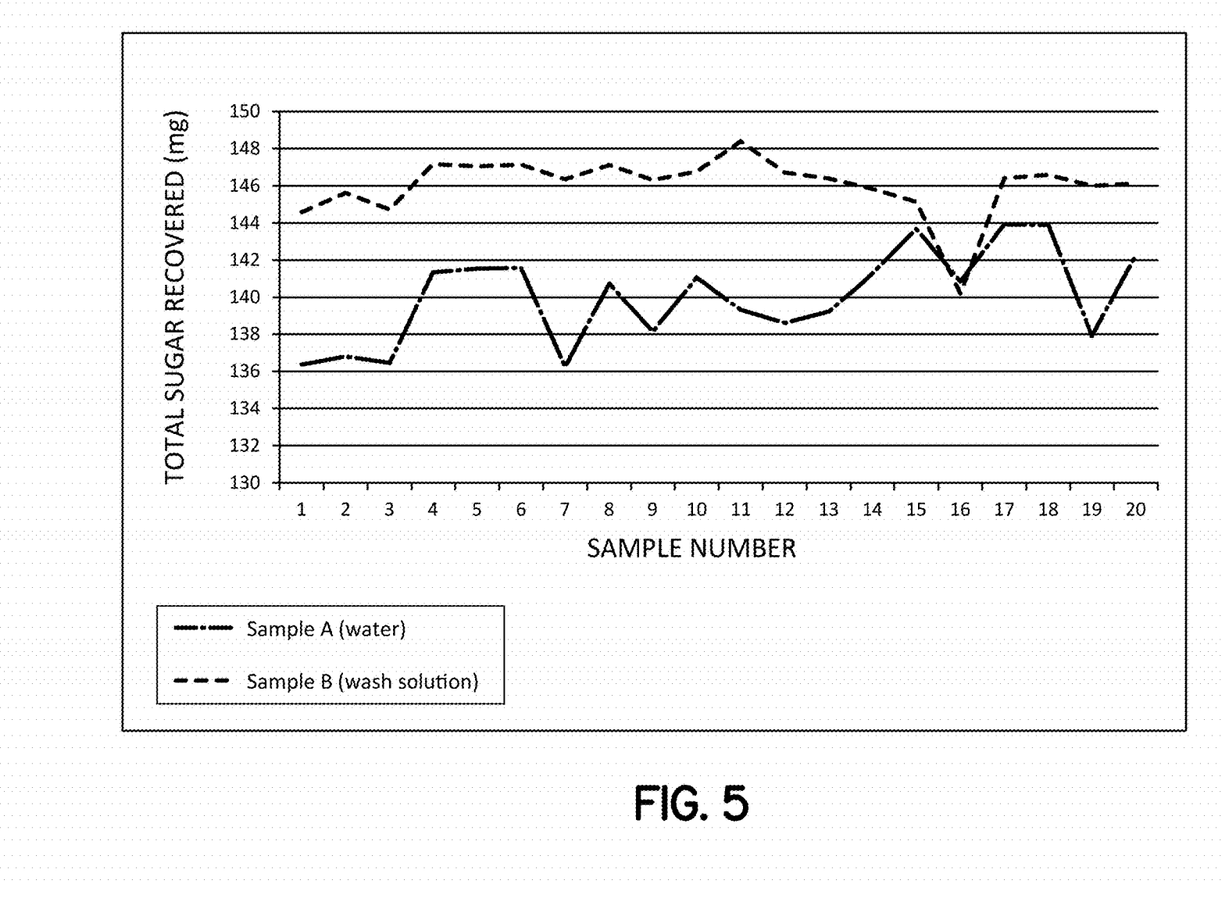
FIG. 5 is a graph of total recovered sugar (ATR) data content from the extracted liquid collected from 20 subsamples from Samples A and B.

Table 5 includes total recovered sugar (ATR) data content from the extracted liquid collected from 20 subsamples from Samples A and B illustrated in FIG. 5.

TABLE 5

| Sample | 1 | 2 | 3 | 4 | 5 | 6 | 7 |
|---|---|---|---|---|---|---|---|
| A | 136.4 | 136.8 | 136.45 | 141.4 | 141.54 | 141.6 | 136.2 |
| B | 144.6 | 145.6 | 144.72 | 147.2 | 147.05 | 147.1 | 146.4 |

| Sample | 8 | 9 | 10 | 11 | 12 | 13 | 14 |
|---|---|---|---|---|---|---|---|
| A | 140.73 | 138.13 | 141.07 | 139.3 | 138.6 | 139.2 | 141.28 |
| B | 147.11 | 146.31 | 146.77 | 148.4 | 146.71 | 146.4 | 145.83 |

| Sample | 15 | 16 | 17 | 18 | 19 | 20 | Avg. |
|---|---|---|---|---|---|---|---|
| A | 143.68 | 140.86 | 143.9 | 143.89 | 137.89 | 142.28 | 140.04 |
| B | 145.13 | 140.21 | 146.4 | 146.59 | 145.99 | 146.13 | 145.97 |

Washing with the wash solution resulted in samples having significantly lower levels of soluble solids (Sample A—20.29, and Sample B—20.11; p<0.01) (see FIG. 1 and Table 1), significantly greater sucrose content (% sucrose) (Sample A—17.16, and Sample B—17.88; p<0.01) (see FIG. 2 and Table 2), purity (% sucrose in Brix) (Sample A—84.57, and Sample B—88.91; p<0.01) (see FIG. 3 and Table 3), significantly lower fiber content (Sample A—13.22, and Sample B—12.92; p<0.01) (see FIG. 4 and Table 4), and significantly greater ATR (Sample A—140.04, and Sample B—145.97; p<0.01) (see FIG. 5 and Table 5).

Figure 6:
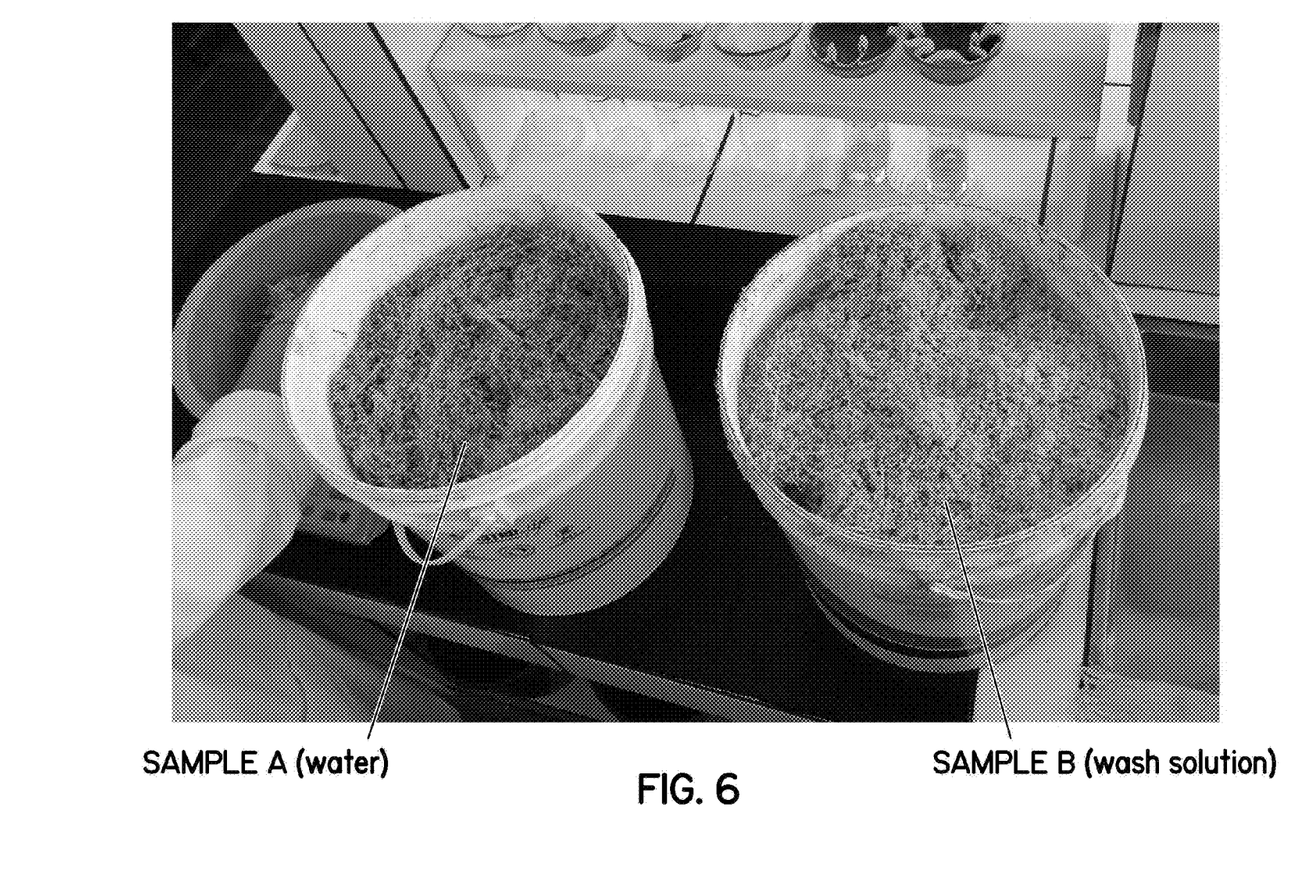
FIG. 6 is a photograph showing sugar cane after washing in water (Sample A) or in the washing solution (Sample B) in accordance with embodiments of the invention.
Figure 7:
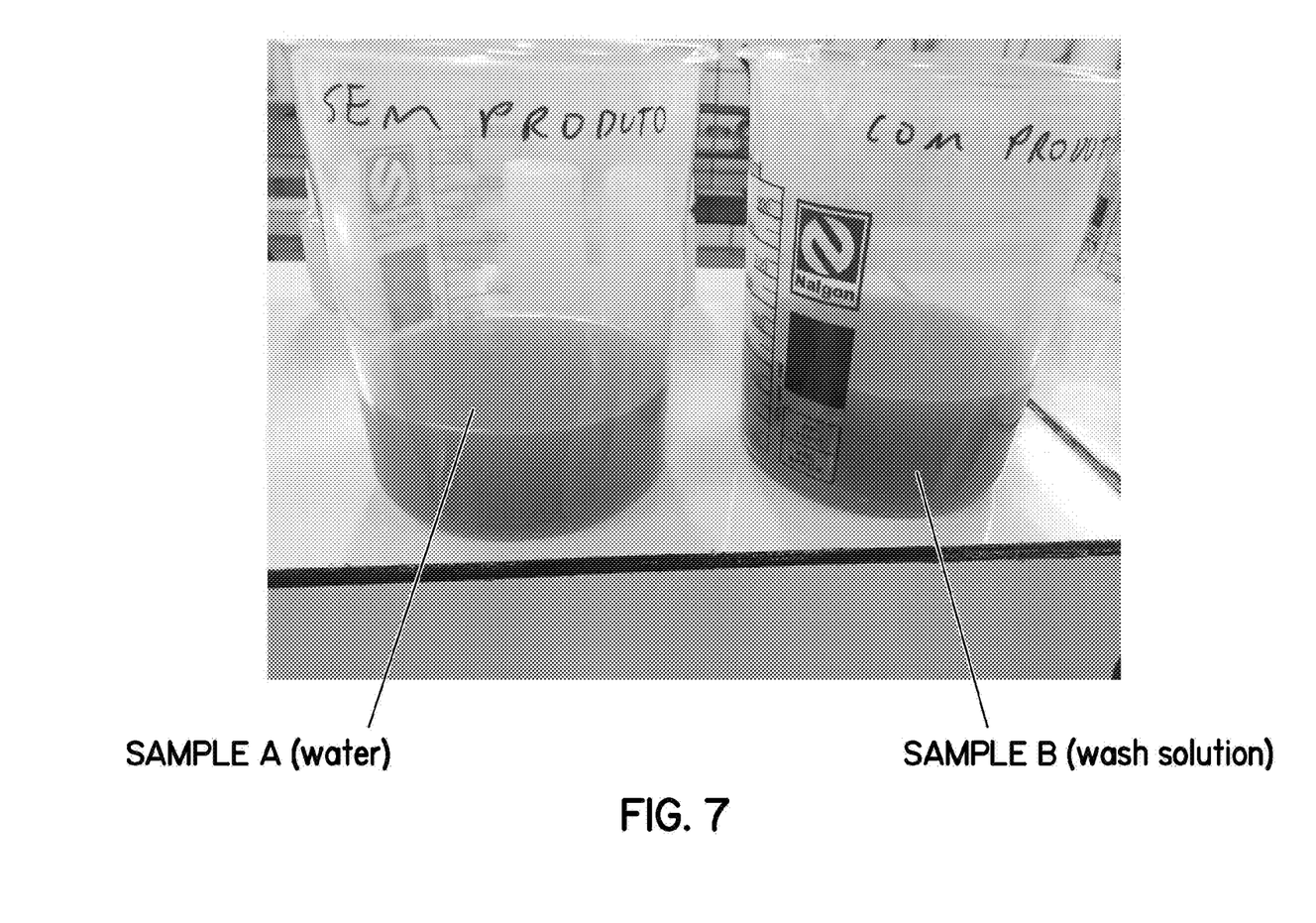
FIG. 7 is a photograph showing the filtered extracted liquid from sugar cane washed in water (Sample A) or the washing solution (Sample B) in accordance with embodiments of the invention.

Moreover, the stalks washed with the wash solution (Sample B) appeared more clean whereas the stalks washed with just water (Sample A) appeared more waxy (see FIG. 6). Also, the ground stalks from Sample B appeared more clean and had a lighter brown color than the ground stalks from Sample A, which was grayer in color. The liquid remaining in the wash tubs after the stalks were removed was darker in color for the wash solution (Sample B) as compared to the water wash (Sample A). Finally, the subsamples from Sample B were passed through the filter more quickly and were more uniform in color than the subsamples from Sample A. The sugar extracted from the stalks washed with the wash solution (Sample B) appeared more concentrated (i.e., darker) compared to the sugar extracted from the stalks washed with just water (Sample A) (see FIG. 7). These data demonstrate washing sugar cane stalks with the wash solution provided significantly improved results as compared to washing with water, which is the routinely used washing media.

Example 2

About 10 kg of sugar cane stalks were divided into two 5 kg samples, a control sample and test sample. The control sample had no water or wash solution applied. The test sample was sprayed with about 150 ml of undiluted wash solution of Example 1. The control and test sample were separately chopped and pressed and the collected liquid was assayed Brix and sugar content as described above with respect to Example 1. As illustrated in Table 6 below, spraying the sugar cane stalks with wash solution prior to cutting and pressing resulted in improved Brix and sucrose content in the liquid collected from the first press.

TABLE 6

|  | Control Sample (No wash) | Test Sample (Sprayed with wash solution) | Percent increase |
|---|---|---|---|
| Brix | 19.22% | 20.72% | 7.8% increase |
| Sucrose Content | 67.49% | 73.34% | 8.7% increase |

Example 3

An unwashed batch of sugar cane was split in a large food processor-like device. The split sugar cane was the divided into two 1 kg samples, a control sample and a test sample. Each sample was separately pressed, as described above with respect to Example 1, and the first press juices were collected.

The bagasse was then washed with 300 ml water (control sample) or 300 ml of dilute wash solution of Example 1 (3% wash solution in 300 ml tap water) (test sample) in an imbibition step. The washed bagasse from each sample was separately pressed and the juice was collected. The imbibition and pressing steps were repeated for a total of five cycles. For each cycle, the bagasse was washed with the juice collected from the previous cycle. The juice collected after the fifth cycle from each of the control and test samples was then analyzed for Brix and sucrose content. As illustrated in Table 7 below, utilizing the dilute wash solution wash solution in the imbibition step resulted in improved Brix and sucrose content in the liquid collected.

TABLE 7

|  | Control Sample (Water imbibition) | Test Sample (Dilute wash solution imbibition) | Percent Increase |
|---|---|---|---|
| Brix | 10.68% | 11.14% | 4.3% increase |
| Sucrose Content | 36.20% | 38.79% | 7.2% increase |

While the present invention has been illustrated by a description of various embodiments and while these embodiments have been described in considerable detail, it is not the intention to restrict or in any way limit the scope of the appended claims to such detail. For example, although the various methods described herein have focused, in part, on extracting sugar from sugar cane, the methods may be used with virtually any type of plant with a desirable sugar content, such as corn, sugar beets, and grains, including, but not limited to, wheat, barley, sorghum, rye, rice, oats and the like. Also, the extracted sugar can be utilized to produce granulated sugar as well as in alcohol production, it should be understood that alcohol production can include, for example, methanol, ethanol, butanol, and the like, as well as modifications and derivatives thereof. It should be further appreciated that in addition to sugar, other plant-contained nutrients can also benefit from the compositions and methods described herein. Additional advantages and modifications will readily appear to those skilled in the art. Thus, the invention in its broader aspects is therefore not limited to the specific details, representative apparatus and methods, and illustrative examples shown and described. Accordingly, departures may be made from such details without departing from the scope of applicant's general inventive concept.

What is claimed is:

1. A process for extracting one or more water soluble nutrients from a plant material, comprising:
    washing the plant material with a wash solution comprising a surface activating agent and a hydroxide solution;
    extracting the one or more water soluble nutrients from the plant material; and
    imbibing the plant material with a liquid, wherein the liquid includes the wash solution diluted in water by a factor of about 10 to about 50.

2. The process of claim 1, wherein the surface activating agent is selected from the group consisting of an anionic surfactant, a non-ionic surfactant, or combinations thereof.

3. The process of claim 1, wherein the surface activating agent includes at least one of a fatty acid, a salt of a fatty acid, or combinations thereof.

4. The process of claim 1, wherein the surface activating agent includes oleic acid, a salt of oleic acid, or combinations thereof.

5. The process of claim 1, wherein the wash solution further comprises a compatibilizing agent, wherein the compatibilizing agent is an alcohol.

6. The process of claim 5, wherein the alcohol is selected from the group consisting of ethanol, glycerin, or combinations thereof.

7. The process of claim 5, wherein the surface activating agent is in a range of from 20% to 40%, the compatibilizing agent is in a range of from 30% to 50%, and the hydroxide solution in a range of from 20% to 40%, where the percentages are weight percentages of relative to the other listed components.

8. The process of claim 5, wherein the wash solution is comprised of 28% oleic acid as the surface activating agent, 21% glycerin as a first compatibilizing agent, 21% ethyl alcohol as a second compatibilizing agent, and 30% potassium hydroxide as the hydroxide solution, where the percentages are weight percentages relative to the other listed components.

9. The process of claim 5, wherein the wash solution is diluted with water, the wash solution includes a surface activating agent in a range of from 1% to 5%, a compatibilizing agent in a range of from 1% to 5%, a hydroxide solution in a range of from 1% to 5%, and water in a range of from 85% to 97% where the percentages are weight percentages relative to the other listed components.

10. The process of claim 5, wherein the wash solution is diluted with water, the wash solution includes 2.65% oleic acid, 2% glycerin, 2% ethyl alcohol, 2.9% of a 45% aqueous solution of potassium hydroxide, and 90.45% deionized water where the percentages are weight percentages relative to the other listed components.

11. The process of claim 1, wherein the wash solution has a pH in a range from about 10 to about 13.

12. The process of claim 1, wherein the one or more water soluble nutrients include at least one sugar selected from the group consisting of glucose, galactose, fructose, and disaccharides thereof.

13. The process of claim 1, wherein the plant material is sugar cane.

14. The process of claim 1, wherein the plant material is washed for a duration of about 30 seconds to about 3 minutes.

15. The process of claim 1, wherein the plant material is washed for a duration of about 1 minute.

16. A process for extracting one or more water soluble nutrients from a plant material, comprising:
    washing the plant material with a wash solution comprising 28% oleic acid as a surface activating agent, 21% glycerin as a first compatibilizing agent, 21% ethyl alcohol as a second compatibilizing agent, and 30% potassium hydroxide as an hydroxide solution, where the percentages are weight percentages relative to the other listed components; and
    extracting the one or more water soluble nutrients from the plant material.

17. A process for extracting one or more water soluble nutrients from a plant material, comprising:
    washing the plant material with a wash solution comprising a surface activating agent in a range of from 1% to 5%, a compatibilizing agent in a range of from 1% to 5%, a hydroxide solution in a range of from 1% to 5%, and water in a range of from 85% to 97% where the percentages are weight percentages relative to the other listed components, wherein the compatibilizing agent is an alcohol; and
    extracting the one or more water soluble nutrients from the plant material.

18. A process for extracting one or more water soluble nutrients from a plant material, comprising:
    washing the plant material with a wash solution comprising 2.65% oleic acid, 2% glycerin, 2% ethyl alcohol, 2.9% of a 45% aqueous solution of potassium hydroxide, and 90.45% deionized water where the percentages are weight percentages relative to the other listed components; and
    extracting the one or more water soluble nutrients from the plant material.

* * * * *